June 18, 1929.  O. F. McATEE  1,717,573
CAP VALVE FOR GASOLINE TANKS AND BATTERIES
Filed Aug. 18, 1928
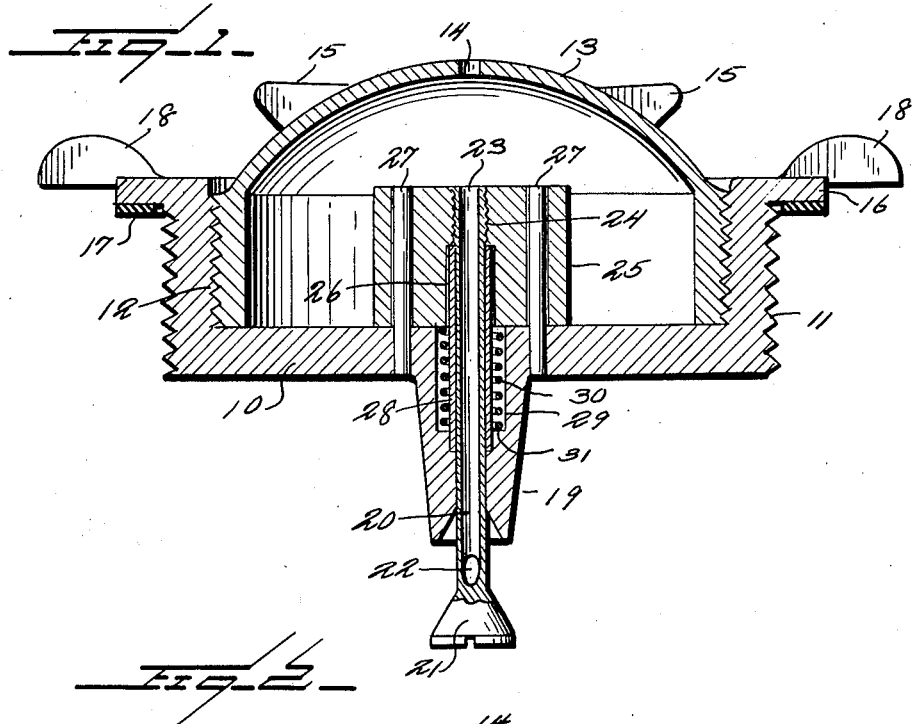
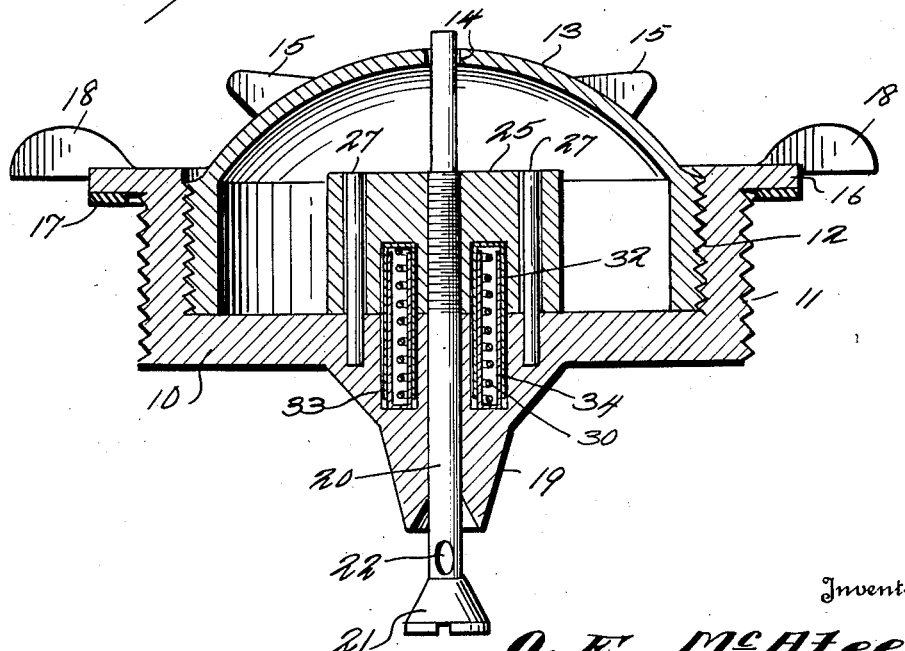
Inventor
O. F. McAtee
By Watson E. Coleman
Attorney Patented June 18, 1929.

1,717,573

UNITED STATES PATENT OFFICE.

OSCAR FRED McATEE, OF PETERSBURG, INDIANA.

CAP VALVE FOR GASOLINE TANKS AND BATTERIES.

Application filed August 18, 1928. Serial No. 300,481.

This invention relates to caps for use on receptacles for gasoline, acids or other liquids which may catch on fire and do undue damage when the receptacle is overturned, the invention being particularly adapted for use on batteries and gasoline tanks of automobiles to prevent, in case of the overturning of the machine, the leakage of the gasoline and the consequent possibility of fire and the leakage of battery acids onto the cushions or upholstery of the car and upon the occupants of the car.

The general object of the invention is to provide a battery cap of this character fulfilling these purposes, in which there is a valve permitting passage of air to the interior of the battery or the interior of the tank or other receptacle, this valve being normally held open by a weight, this weight however, acting when the car and the receptacle with it is overturned or inverted to cause the closing of this aperture and thus preventing the discharge of gasoline, acids, or other liquid from the tank or receptacle.

Another object in this connection is to provide a spring whose tension is somewhat less than the thrust exerted by the weight so that the weight will normally hold the valve open, this spring acting to cause sudden and full closing of the valve when the receptacle is tilted and a portion of the thrust exerted by the weight is eliminated.

Other objects have to do with the details of construction and arrangement of parts as will be hereinafter described.

My invention is illustrated in the accompanying drawings wherein—

Figure 1 is a diametric section through the cap and valve, and

Figure 2 is a like view to Fig. 1 but showing a modification.

Referring to these drawings, 10 designates the cap proper. This cap is exteriorly screw-threaded as at 11 for the engagement with the wall of any receptacle, such as a gasoline tank, a battery box, or the like. This wall is also interiorly screw-threaded at 12 for engagement with the exterior screw-threads of an inner cap or cover designated 13, which is provided with an air inlet opening 14, and with wings 15 whereby it may be released. The cap 10 is flanged at 16 to bear against a gasket 17 on the tank and is provided with wings or lugs 18, whereby the cap may be removed.

The center of the cap has a downwardly extending hub 19 apertured for the passage of an elongated tubular stem 20 terminating at its lower end in an inverted conical head 21 nicked for engagement by a screw-driver. This stem 20 is hollow and at its lower end is provided with an aperture 22, while the upper end of the stem has an aperture 23. The upper end of the stem is screw-threaded for engagement with the screw-threads of a bore 24 which is formed in a weight 25. The bore of this weight is preferably enlarged at its lower end as at 26. Preferably the weight will be guided upon two pins 27, the weight being apertured for the passage of these pins, these pins projecting from the cap 10 and constituting guides for the weight.

Surrounding the hollow stem 20 and disposed within the bore in an enlarged portion 26 of the bore 24, and extending downward into the hub 19 is a tubular sleeve 28 through which the stem 20 can easily move. The weight, which is made of lead, so as not to be affected by acids, when it is in its lowest position rests upon the top of this sleeve 28. Surrounding the lower portion of this sleeve and disposed in an enlargement 29 of the bore in the hub 17 through which the stem 20 passes is a coil compression spring 30. This spring, at its lower end bears against a shoulder 31 and at its upper end bears against the weight. This spring is slightly weaker than the downward thrust exerted by the weight and, therefore, when the tank and of course the car upon which the tank is mounted, is erect the weight will hold the valve down in its open position against the tension of the spring 30.

When the car is turned over, however, on its side, this downward pressure of the weight is relieved, that is the weight will not exert so great a downward thrust and the spring will force the weight and the valve stem connected thereto outward and close the valve. If the car be turned entirely over, of course the weight will operate itself to close the valve and the aid of the spring will not be needed, but the spring operates to cause the closing of the valve suddenly when the downward thrust of the weight has been slightly relieved by the turning of the car over upon its side. By placing the spring 30 around the sleeve 29 the spring is protected to a considerable extent from acid vapors.

As illustrated in Fig. 2 in order to more thoroughly protect the spring from contact with the acids or the vapors from acids and, therefore, protect the spring from corrosion, I may form within the weight 25 an annular compartment 32 and form a complementary annular compartment 33 in the hub 19, these compartments being spaced from the bore through which the valve stem 20 passes and dispose the spring 30 in this compartment and to still more effectively protect the spring, I may surround the spring with a loose casing or flexible casing of rubber or like material designated 34 within which the spring is enclosed. Of course, this is only necessary where my device is used as a battery cap valve or where it is used in connection with corrosive or other acid fluids.

Where this cap is to be used for batteries it will be preferably made of hard Para rubber or of enameled metal. Otherwise the cap can be of brass, lead, steel, or other suitable material, and the outside of the cap can be nickel-plated.

While I have before referred to rubber 34 as enclosing the spring, it will be understood that lead or like material might be used. This will prevent contact with the spring with the acid in case of boiling over.

As illustrated in Fig. 2 the stem 20 may be extended up through the cap 13, that is, through the aperture 14 so as to protrude above the cap 13 and this will prevent acids from running down inside the cap in case of overflow.

What I claim is—

1. An air inlet cap for liquid receptacles, having an aperture therethrough, a tubular valve stem extending through the cap apertured adjacent its opposite ends and means holding the valve stem in an open position while the receptacle is in a normal position, said means acting to shift the stem to a closed position when the receptacle is wholly or partially inverted.

2. A cap for liquid receptacles having an aperture therethrough, a valve therein, a weight holding the valve open to permit the passage of air through said aperture to the interior of the tank while the receptacle is in a normal position, and a spring urging the valve to a closed position, the thrust exerted by the spring to open the valve being slightly less than the thrust exerted by the weight under the action of gravity, whereby to cause the valve to close when the receptacle is tilted from its normal position.

3. An air inlet cap for liquid receptacles having an aperture therethrough, a tubular valve stem operating in the apertures having an opening adjacent its inner end and an opening at its other end and having a head beyond the first named opening, a weight carried by the valve stem and urging it to a lowered open position, guides whereby the weight will move in a rectilinear direction and a compression spring bearing against the weight and urging it in a direction to shift the stem to a closed position, the thrust exerted by the spring being slightly less than the thrust exerted by the weight under the action of gravity.

4. An air inlet cap for liquid receptacles, having a centrally disposed hub with an axial bore, a tubular valve stem mounted in said bore and having a head at its lower end adapted to seat against the lower end of the hub and inward of this head having an opening, the opposite end of the stem being open to permit the inlet of air to the interior of the receptacle, a weight exterior of the cap and having screw-threaded engagement therewith and urging it in a direction to close the valve, the spring having such a tension that its thrust is slightly less than the thrust of the weight under the action of gravity, the hub being formed with a chamber concentric to but separated from the tubular stem within which the spring is disposed.

5. An air inlet cap for liquid receptacles, having a centrally disposed hub with an axial bore, a tubular valve stem mounted in said bore and having a head at its lower end adapted to seat against the lower end of the hub and inward of this head having an opening, the opposite end of the stem being open to permit the inlet of air to the interior of the receptacle, a weight exterior of the cap and having screw-threaded engagement therewith and urging it in a direction to close the valve, the spring having such a tension that its thrust is slightly less than the thrust of the weight under the action of gravity, the hub being formed with a chamber concentric to but separated from the tubular stem within which the spring is disposed, the spring being enclosed within a flexible casing to protect it from the action of acids.

6. A closure for liquid receptacles comprising a body having a depending hub having an axial bore, a tubular valve stem disposed in said bore and extending down below the hub and formed with a head, the valve stem having an opening above the head and being open at its upper end, a weight surrounding the upper end of the valve stem and attached thereto and urging the valve stem to a lowered position with its lower port uncovered, guides carried by the body and guiding the weight for rectilinear movement, and a spring disposed within the hub and operatively engaging the weight to urge the weight and valve stem upward, the thrust exerted by the spring being slightly less than the thrust exerted by the weight under the action of gravity.

In testimony whereof I hereunto affix my signature.

OSCAR FRED McATEE.